March 8, 1960 O. L. MacSORLEY ET AL 2,928,049

TRANSISTOR AMPLIFIER CIRCUIT

Filed Sept. 30, 1954

*INVENTORS*

OLIN L. MAC SORLEY

HENRY E. COOLEY

BY P. E. Henninger

ATTORNEY

United States Patent Office 2,928,049

Patented Mar. 8, 1960

2,928,049

TRANSISTOR AMPLIFIER CIRCUIT

Olin L. MacSorley, Poughkeepsie, and Henry E. Cooley, Wappingers Falls, N.Y., assignors to International Business Machines Corporation, New York, N.Y., a corporation of New York Application September 30, 1954, Serial No. 459,386

4 Claims. (Cl. 330—24)

Figure 1:
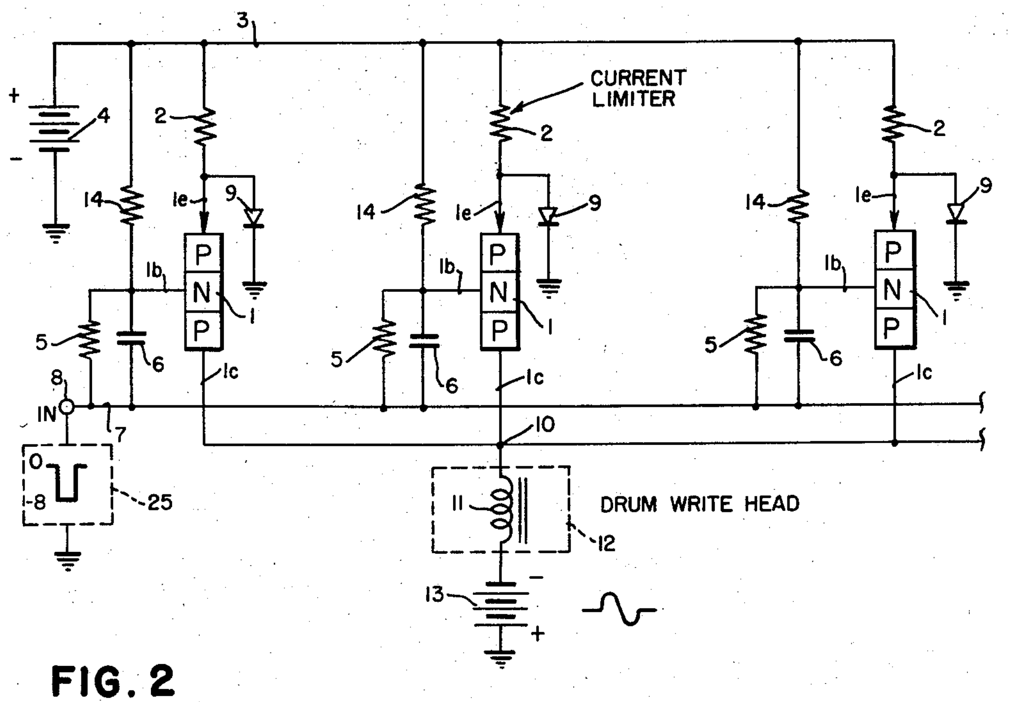

This invention relates to amplifier circuits and especially to transistor amplifier circuits for driving loads requiring relatively heavy currents and/or having relatively high impedance.

Modern high speed computers employ data storage devices, in which data to be used in some future computation is stored until such time as it is needed. One of the most popular and effective types of storage devices employs a magnetic tape or a magnetic drum. Data is stored on the tape or drum by magnetizing small areas of the tape or drum surface with fields of different intensities or polarities. The magnetization of these areas on the tape or drum is commonly carried out by an electromagnetic coil, the tape or drum being driven past the coil, or writing head as it is called, while the coil is energized by an electric current cooled in accordance with the data to be stored. Typically, the current in the coil consists of a series of pulses, which are effective to produce on the tape or drum small magnetized areas having sharply defined boundaries. In order to utilize the storage capacity of a drum or tape to the utmost, it is desirable to make these magnetized areas as small as possible. For that purpose, it is desirable to have the current pulses flowing in the coil repeated at a high frequency. Furthermore, such coils require substantial currents in order to produce magnetic fields of high intensity.

Transistors have recently come into use as translating and amplifying devices in high speed computers, being particularly suitable to that work because of their low power requirements, in view of the tremendous number, e.g. many thousands, of such devices which are required in complex computers. The use of transistor circuits in such computers presents problems with respect to the energization of the magnetizing coils of the data storage devices, because of the low current capacities of transistors as compared to the coil requirements, and because of the low frequency and low voltage limitations common in transistor circuits.

It has been proposed to operate transistors in parallel to supply heavier currents than can be handled by a single transistor. However, in conventional circuit arrangements, the division of load between parallel transistors is determined by their internal resistances, with the result that one of two parallel transistors may be overloaded, while the other is supplying negligible current.

An object of the invention is to provide a transistor amplifier circuit for supplying heavy currents.

Another object is to provide a transistor amplifier circuit including parallel connected transistors and means for controlling the division of the load between the transistors.

A further object is to provide a transistor amplifier circuit for supplying square waves to a coil for magnetizing a data storage device.

These objects are attained in the circuits described herein, by connecting several transistors in parallel. In other words, the input terminals of the transistors are connected in parallel to a common input terminal, and the output electrodes of the transistors are likewise connected in parallel to a common output terminal. Each of the several parallel connected transistors is arranged as an inverter circuit which is biased to cut off. The emitter of each transistor is clamped to ground through a diode to prevent it from going more positive than ground. A current limiting resistor is connected in each emitter circuit so that each individual transistor output current and the total output current of the parallel transistors may be controlled.

In one modification of the invention, the input signals are supplied to the transistors through a resistor-capacitor coupling, to insure sharp response, and faithful following of the square wave forms. In another modification of the invention, a transformer coupling is used for the input signals to improve operation at higher frequencies, and to allow impedance matching with the circuit which supplies signals to the amplifier.

Figure 2:
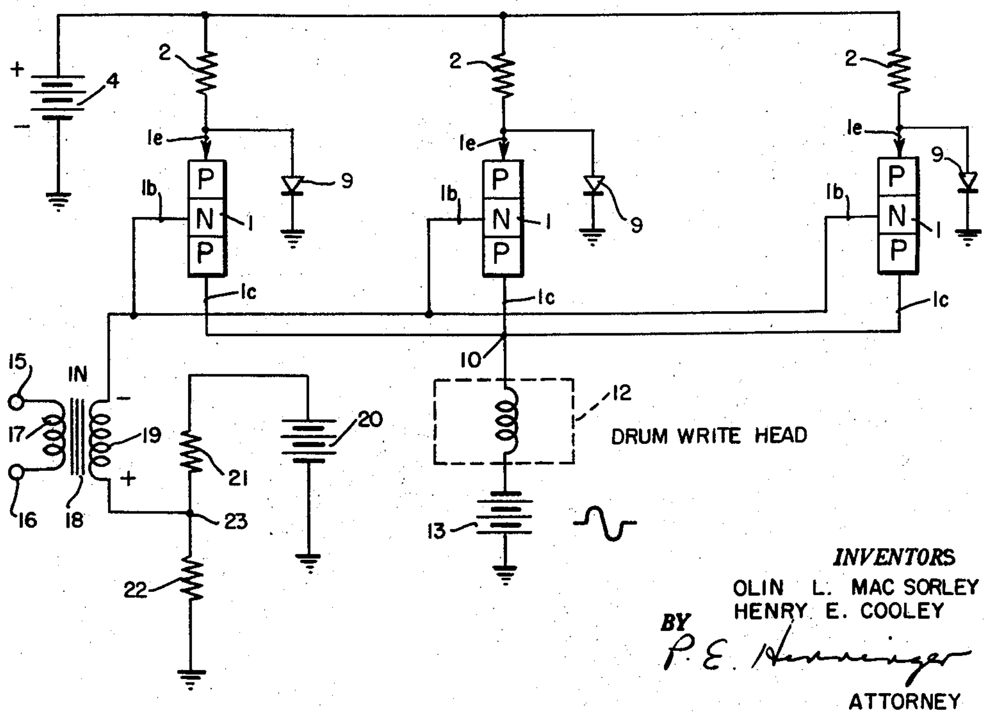

Other objects and advantages of the invention will become apparent from a consideration of the following specification and claims, taken together with the accompanying drawings. In the drawings:

Figure 1 is a wiring diagram of an amplifier circuit embodying the invention; and Figure 2 is a wiring diagram of another amplifier circuit embodying the invention.

FIGURE 1

This figure illustrates a circuit including three transistors 1 which are connected in parallel. The invention is not limited to the use of any specific number of transistors, three being chosen for convenience of illustration only. Each of the transistors 1 and its associated circuit elements are equivalent to their counterparts, so the same reference numerals have been used for all corresponding elements.

Each transistor 1 is a PNP junction transistor, having an emitter *1e*, a base *1b* and a collector *1c*. Emitter *1e* is connected through a resistor 2 to a common junction wire 3 leading to the positive terminal of a battery 4, whose negative terminal is connected to ground. Base *1b* is connected through a resistor 5 and a parallel capacitor 6 to a common junction wire 7 leading to a signal input terminal 8. A diode 9 is connected between emitter *1e* and ground. Collector *1c* is connected to a common junction 10 and thence through the coil 11 of a drum write head generally indicated at 12 to the negative terminal of a battery 13, whose opposite terminal is connected to ground. A resistor 14 is connected between base *1b* and wire 3.

A square wave signal generator 25 is connected between input terminal 8 and ground. The generator 25 has a "no signal" potential of 0 volts and a "signal" potential of −8 volts.

OPERATION—FIGURE 1

Considering first the operation of one of the transistors alone, its emitter *1e* is biased positively by the battery 4 through resistor 2, but it is clamped at ground potential by the diode 9. In other words, the emitter may swing negatively with respect to ground, but it can not swing positively. Base *1b* is biased positively with respect to ground by battery 4 through resistor 14. The resistor 14 is chosen so that base *1b* is just sufficiently positive to insure that the transistor is normally cut off. The no-signal condition at the input terminal 8 is 0 volts, or ground potential. It may be seen that the resistors 14 and 5 form a voltage divider supplied by the battery 4 under no signal conditions, and that the values selected for resistors 14 and 5 establish the potential of base *1b*.

When a signal is received at input terminal 8, its potential drops to −8 volts, swinging the base 1b negative with respect to ground and turning the transistor on.

The same response occurs at all three of the transistors in parallel, so that when an input signal is received at terminal 8, the output currents of all three transistors are delivered through junction 10 to the coil 11.

When any transistor is conductive, the resistor 2 connected in series with its emitter serves as a current limiting resistor. Specifically, as the emitter current goes up, a potential drop occurs across resistor 2 which tends to swing emitter 1e increasingly in a negative direction. Eventually, the emitter 1e will be shifted to a potential sufficiently negative that a further change in that direction will start decreasing the current flow through the transistor. The current limit has then been reached. By properly selecting the current limiting resistors, the maximum output current for the individual transistors can be determined, so that the current in the coil 11 can be supplied in accordance with the requirements of the drum write head 12. For example, in the circuit illustrated, each transistor will supply approximately 16 ma. making a total of approximately 48 ma. for the three transistors. Furthermore, the division of the total load among the several transistors may be established independently of the internal impedances of the transistors. Consequently, the load may be evenly divided, with none overloaded, and with each contributing a share.

The diode 9 which grounds the emitter 1e has low forward resistance, and a quick recovery characteristic. When the transistor is conducting current, the emitter becomes negative with respect to ground, which causes the diode to enter its high resistance state, and the current which was formerly going through the diode goes through the transistor. When the input signal 8 cuts off, the transistor stops conducting, the emitter voltage rises toward +45, and is caught by the diode at ground. When the emitter 1e is at ground potential, the transistor is then immediately sensitive to another input signal.

FIGURE 2

In this figure, many of the circuit elements of Figure 2 are the same as their counterparts in Figure 1, and have been given the same reference numerals. As in Figure 1, the circuit of Figure 2 comprises three transistors 1. The principal difference between the two circuits lies in the signal input arrangements.

Incoming signals for the circuit of Figure 2 are received at a pair of input terminals 15 and 16, which are connected to the opposite ends of a primary winding 17 of a transformer 18. Transformer 18 has a secondary winding 19 having its upper terminal connected to the base 1b of all three of the transistors. A battery 20 supplies a voltage divider including resistors 21 and 22. The lower terminal of secondary winding 19 is connected to the junction 23 between resistors 21 and 22.

OPERATION—FIGURE 2

Under no signal conditions, the bias potential, taken from the junction 23 in the voltage divider circuit, is effective to hold the base 1b positive with respect to ground. The emitters 1e are clamped at ground potential by the diodes 9, so that the transistors are cut off. When an input signal is received in terminals 15 and 16, the polarity of the secondary winding 19 is arranged so that its upper terminal then becomes 8 volts negative with respect to its lower terminal. This potential is effective to swing bases 1b negative and turn the transistors 1 on.

As in the case of Figure 1, the resistors 2 operate to limit the current flow through the respective transistors. Also, as in Figure 1, the diodes 9 insure a quick recovery of the transistors after the passage of a signal.

While PNP junction transistors have been shown, it will be recognized that NPN transistors could be used with equal facility by reversing the polarity on all the batteries, and making other changes well understood by those skilled in the art.

The following table shows by way of example particular values for the potentials of the various batteries and for the impedances of the various resistors and capacitors, in circuits which have been operated successfully. In some cases, the values are also shown in the drawing. These values are set forth by way of example, and the invention is not limited to them nor to any of them. The diodes are considered to have substantially no impedance in their forward direction, and substantially infinite impedance in their reverse direction.

*Table 1*

| | | |
|---|---|---|
| Resistor 2 | ohms | 3K |
| Battery 4 | volts | 45 |
| Resistor 5 | ohms | 10K |
| Capacitor 6 | mfd | 680 |
| Battery 13 | volts | 15 |
| Resistor 14 | ohms | 330K |
| Battery 20 | volts | 45 |
| Resistor 21 | ohms | 4.7K |
| Resistor 22 | do | 100 |

While we have shown and described certain preferred embodiments of our invention, other modifications thereof will readily occur to those skilled in the art, and we therefore intend our invention to be limited only by the appended claims.

We claim:

1. An amplifier comprising a plurality of transistors, each having a common electrode, an input electrode, and an output electrode, a plurality of current limiting resistors, one for each transistor, means connecting the respective resistors in series with the common electrodes of their associated transistors, input circuit means including said resistors and connecting means and connected to the input electrodes, said input circuit means comprising a source of biasing potential tending to maintain a reverse bias between the common and input electrodes of all the transistors and signal input means providing a signal varying between a no-signal condition in which all the transistors are held cut off by the biasing source and a signal condition effective to overcome the biasing source and cause a substantial flow of current in all the transistors, output circuit means including said resistors and connecting means, said output circuit means connecting the output electrodes together and in series with a load device and a source of unidirectional electrical energy, said current limiting resistors having resistances effective when the transistors are conducting current to ensure a division among the transistors of the current flow through the load device.

2. An amplifier as defined in claim 1, in which the input circuit means and the output circuit means connect a first junction to the terminals of the resistors remote from their associated common electrodes, and said output circuit means connects a second junction to the terminal of the series-connected load device and energy source remote from the output electrodes, said input circuit means including means connecting the biasing potential source between said first and second junctions, and means connecting the signal input means between said second junction and a third junction, said input circuit means further comprising, for each transistor, two resistors connected in series between the first and third junctions, and a connection between the common terminal of the two resistors and the input electrode of the associated transistor; and also including, for each transistor, a capacitor connected between the input electrode and said third junction.

3. An amplifier as defined in claim 1, in which the input circuit means and the output circuit means connect a first junction to the terminals of the resistors remote from their associated common electrodes, and the output circuit means connects a second junction to the terminal of the series-connected load device and energy source remote from the output electrodes, said input circuit means comprising a single voltage divider serving all said transistors and comprising two resistors connected in series across said potential source, a connection between one terminal of the potential source and said second junction, a connection between the common terminal of the two resistors and one terminal of the signal input means, and a connection between the other terminal of the signal input means and all the input electrodes in parallel.

4. An amplifier as defined in claim 1, in which said input circuit means and said output circuit means connect a first junction to the terminals of the resistors remote from their associated common electrodes, said output circuit means connects at least a portion of said source of energy between said first junction and a second junction, and a plurality of diodes, one for each transistor, connected between said second junction and the common electrode of the associated transistor, said diodes being poled forwardly to current from said portion of the source, so that current flows continuously from said source portion through said resistors, and is switched between the diodes and the common electrodes by operation of said signal input means.

References Cited in the file of this patent

UNITED STATES PATENTS

| | | |
|---|---|---|
| 1,550,684 | Espenshied | Aug. 25, 1925 |
| 2,535,912 | Frank et al. | Dec. 26, 1950 |
| 2,612,567 | Stuetzer | Sept. 30, 1952 |
| 2,646,472 | Rockwell | July 21, 1953 |
| 2,647,958 | Barney | Aug. 4, 1953 |
| 2,655,610 | Ebers | Oct. 13, 1953 |
| 2,666,818 | Shockley | Jan. 19, 1954 |
| 2,680,160 | Yaeger | June 1, 1954 |
| 2,717,931 | Duke | Sept. 13, 1955 |
| 2,759,052 | Macdonald et al. | Aug. 14, 1956 |
| 2,760,087 | Felker | Aug. 21, 1956 |

OTHER REFERENCES

Article in "Electronics," September 1948, page 69.

Shea text, "Principles of Transistor Circuits," pp. 148–149, pub. 1953 by John Wiley & Sons, N.Y.

Korn: "Electronic Analog Computers," page 177, copyright 1952.

McMahon et al.: "Transistors Convert Sine Waves to Pulses," Electronics, May 1954, pages 160, 161.

UNITED STATES PATENT OFFICE

CERTIFICATE OF CORRECTION

Patent No. 2,928,049 March 8, 1960

Olin L. MacSorley et al.

It is hereby certified that error appears in the printed specification of the above numbered patent requiring correction and that the said Letters Patent should read as corrected below.

Column 1, line 30, for "cooled" read -- coded --.

Signed and sealed this 18th day of October 1960.

(SEAL)
Attest:

KARL H. AXLINE
Attesting Officer

ROBERT C. WATSON
Commissioner of Patents